(12) United States Patent
Boehmer et al.

(10) Patent No.: US 7,045,937 B2
(45) Date of Patent: May 16, 2006

(54) ELECTRIC LAMP LAMP VESSEL PROVIDED WITH A LIGHT-ABSORBING COATING AND METHOD OF PREPARING SUCH A LIGHT-ABSORBING COATING

(75) Inventors: Marcel Rene Boehmer, Singapore (SG); Theodora Antonia Petra Maria Keursten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 49 days.

(21) Appl. No.: 10/489,067

(22) PCT Filed: Sep. 13, 2002

(86) PCT No.: PCT/IB02/03815

§ 371 (c)(1),
(2), (4) Date: Mar. 9, 2004

(87) PCT Pub. No.: WO03/023916

PCT Pub. Date: Mar. 20, 2003

(65) Prior Publication Data

US 2004/0232821 A1    Nov. 25, 2004

(30) Foreign Application Priority Data

Sep. 13, 2001    (EP) .................................. 01203465

(51) Int. Cl.
*H01J 5/16*    (2006.01)
(52) U.S. Cl. ..................................... 313/112; 313/580
(58) Field of Classification Search ........ 313/110–112, 313/580; 428/447, 328–331, 448
See application file for complete search history.

(56) References Cited

U.S. PATENT DOCUMENTS

| | | | | |
|---|---|---|---|---|
| 5,445,871 A | * | 8/1995 | Murase et al. | 428/215 |
| 5,534,748 A | * | 7/1996 | Oomen | 313/479 |
| 5,731,091 A | * | 3/1998 | Schmidt et al. | 428/428 |
| 6,156,388 A | * | 12/2000 | Endres et al. | 427/376.2 |
| 6,342,762 B1 | * | 1/2002 | Young et al. | 313/580 |
| 2001/0020812 A1 | * | 9/2001 | Sagawa et al. | 313/110 |
| 2005/0064208 A1 | * | 3/2005 | Boehmer et al. | 428/447 |

* cited by examiner

*Primary Examiner*—Joseph Williams
*Assistant Examiner*—Dalei Dong

(57) ABSTRACT

An electric lamp includes a light-transmitting lamp vessel which accommodates a light source. At least a part of the lamp vessel is provided with a light-absorbing coating which has stabilized pigments that are incorporated in a sol-gel matrix. Aminosilane is included in order to stabilize the pigments.

12 Claims, 2 Drawing Sheets

Figure 1:
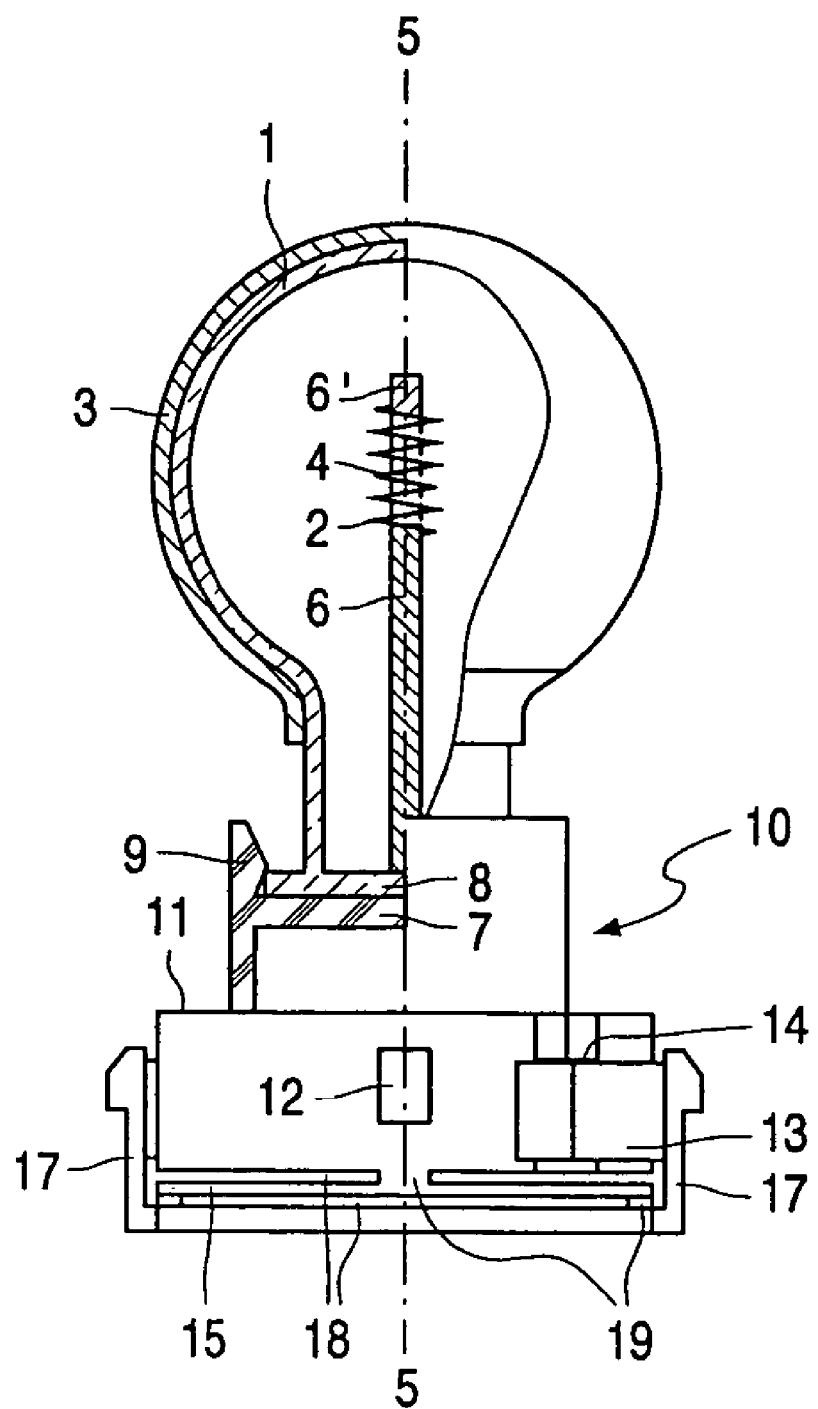

ELECTRIC LAMP LAMP VESSEL PROVIDED WITH A LIGHT-ABSORBING COATING AND METHOD OF PREPARING SUCH A LIGHT-ABSORBING COATING

The present invention relates to an electric lamp comprising a light-transmitting lamp vessel which accommodates a light source, wherein at least a part of the lamp vessel is provided with a light-absorbing coating, said the light-absorbing coating comprising stabilized pigments incorporated in a sol-gel matrix.

Such electric lamps are predominantly used as indicator lamps in vehicles, for example as an amber-colored light source in indicators or as a red-colored light source in brake lights of automobiles. Alternative embodiments of such lamps, wherein the color temperature is increased by means of a light-absorbing coating, can also be used as headlamps of a vehicle. Said light-absorbing coatings are also used as a color layer on (incandescent) lamps for general lighting purposes. Said electric lamps can also be used in traffic lights.

An electric lamp of the type mentioned in the opening paragraph is known from WO 01/20641 in the name of the current applicant. The electric lamp according to WO 01/20641 is provided with an optically transparent, non-scattering, light-absorbing coating in which pigments are incorporated in a sol-gel matrix and which can resist temperatures up to 400° C. The sol-gel matrix in which the pigments are incorporated can reach a maximum layer thickness of about 500–800 nm when tetraethoxy silane (TEOS) is used as a sol-gel presursor and a maximum layer thickness of about 2–3 µm when methyltrimethoxy silane (MTMS) is used as a sol-gel precursor.

According to WO 01/20641, the pigments are stabilized by means of an organic polymer. Depending on the curing temperature, said polymers partly disappear from the coating in the curing treatment and may further burn out during the operation of the lamp when high temperatures are reached. This leads either to shrinkage of the coating layer or to an increased porosity thereof or to a combination of both.

It is an object of the invention to provide an electric lamp according to the preamble, wherein the above drawbacks have been obviated. Furthermore, it is an object of the invention to provide a lamp vessel which is fit for said electric lamp, as well as to provide a method of preparing a light-absorbing coating to be applied to the lamp vessel of an electric lamp. To this end, the electric lamp according to the preamble is characterized in that an aminosilane is present in order to stabilize the pigments.

The use of an aminosilane as a stabilizer for the pigment leads to a strong reduction of the organic fraction in the layer, which results in a lamp coating which does not change during the lifetime of the lamp. Moreover, the mechanical properties of the coating are improved as a chemical bond is formed between the pigment particles and the sol-gel network.

As aminosilane hardly takes up any volume in the layer at the quantities required, it is possible to make coatings containing a higher particle volume fraction. This is contrary to the situation in which organic stabilizers are used, as the latter take up a very large volume. Using aminosilane as a stabilizer, high pigment particle volume fractions can be obtained and therefore coatings can be made which exceed the maximum layer thickness of 500–800 nm for TEOS and 2–3 µm for MTMS. In these coatings the sol-gel only has to bridge the gap between the pigment particles, not the gap from the bottom to the top of the layer. In a particular embodiment, a dimethylaminopropylsilane is used as a stabilizer.

Dimethylaminopropylsilane is preferred to most ordinary aminosilanes as the latter promote the gelation of acidic sol-gel hydrolysis mixtures too strongly. Furthermore, dimethylaminopropylsilane is a good stabilizer for many inorganic pigments, and a transparent coating can be obtained if small pigment particles are used. Another preferred aminosilane is a salt of trimethylaminopropylsilane.

As electric lamps generally operate at high temperatures, strict requirements are placed on the matrix material as well as the pigment used. Inorganic pigments have good temperature stability. In order to improve the color strength, the formation of relatively thick coatings is required. As already disclosed in WO 01/20641, methyltrimethoxysilane (MTMS) is an example of a suitable starting material for the sol-gel matrix, which enables relatively thick coatings to be obtained.

Preferably, a (N,N-dimethylaminopropyl)trialkoxysilane, such as in particular (N,N-dimethylaminopropyl)trimethoxysilane or (N,N-dimethylaminopropyl)triethoxysilane, is used as a stabilizer.

By using one of said stabilizers, also referred to as 2 Me-APTMS and 2 Me-APTES respectively, highly concentrated inorganic pigment dispersions can be made. Because of the increased viscosity and the high pigment volume fraction in the cured layer, it is possible to make coating layers having a thickness of about 4 to 5 µm. The aim is to make a close-packed layer of stabilized pigment particles, with the interparticle space being filled with sol-gel material. When concentrated pigment dispersions are used, coatings can be made in which the pigment particles occupy about 45–50% of the volume of the coating, which is the maximum. These layers show no shrinkage or increased scattering during operation of the lamp. By using zinc ferrite as a pigment, totally inorganic amber-colored coatings can be obtained. These coatings fulfill both the S.A.E- and E.C.E.-specifications. By using iron oxide, layers within the specification for red may be applied. It is also possible to stabilize cobalt aluminate by using 2 Me-APTMS, which can be applied to make bluish-colored automotive lamps.

Preferably, the thickness $t_c$ of the light-absorbing coating is $t_c \geq 1.5$ µm.

A relatively thick coating layer is preferred as such a layer can incorporate more pigment, thereby improving the color effect of the coating.

In an advantageous embodiment, the thickness $t_c$ of the light-absorbing coating is $t_c \geq 4$ µm.

As mentioned earlier, such a coating thickness is especially preferred when inorganic pigments are used.

To manufacture light-absorbing coatings having the desired optical properties, said coatings having the desired thermal stability during the service life of the electric lamp, use is preferably made of inorganic pigments. In a favorable embodiment of the electric lamp in accordance with the invention, the pigment is selected from the group formed by iron oxide, iron oxide doped with phosphor, zinc-iron oxide, cobalt aluminate, neodymium oxide, bismuth vanadate, zirconium praseodymium silicate or mixtures thereof. Iron oxide ($Fe_2O_3$) is an orange pigment and P-doped $Fe_2O_3$ is an orange-red pigment. Zinc-iron oxide, for example $ZnFe_2O_4$ or $ZnO.ZnFe_2O_4$ are yellow pigments. Mixing (P-doped) $Fe_2O_3$ with $ZnFe_2O_4$ yields a layer of a deep orange color. Cobalt aluminate ($CoAl_2O_4$) and neodymium oxide ($Nd_2O_5$) are blue pigments. Bismuth vanadate ($BiVO_4$), also referred to as pucherite, is a yellow-green pigment. Zirconium praseodymium silicate is a yellow pigment.

The present invention also relates to a lamp vessel provided with a light-absorbing coating, the light-absorbing coating comprising stabilized pigments which are incorporated in a sol-gel matrix, characterized in that an aminosilane is present in order to stabilize the pigments as disclosed in the above.

Finally, the present invention relates to a method of preparing a light-absorbing coating that is to be applied to the lamp vessel of an electric lamp, said method at least comprising the steps of:

preparing a pigment dispersion by mixing said pigment with an alcohol-comprising liquid and adding an aminosilane in order to stabilize the pigment;
preparing a hydrolysis mixture comprising a silane which is subjected to a sol-gel process; and
mixing the pigment dispersion and the hydrolysis mixture.

Advantageously, the alcohol-comprising liquid comprises a water/ethanol mixture. In order to promote dispersion of the pigments, it is moreover advantageous to add an acid to the pigment dispersion.

For transparent, strongly colored layers, control of particle size is crucial. It is important to obtain the smallest pigments available, which then have to be properly dispersed to eliminate aggregates. Therefore, after addition of the aminosilane, the pigment dispersion is milled using milling balls.

It has been found that an electric lamp comprising a lamp vessel which is coated in accordance with the invention with a light-absorbing coating comprising stabilized pigments incorporated in a sol-gel matrix, in which an aminosilane is present in order to stabilize the pigments, preserves its initial properties to a substantial degree during the service life of the electric lamp. Moreover, the possibility of the applying relatively thick light-absorbing coatings is offered, which is especially advantageous when inorganic pigments are used.

These and other aspects of the invention will be apparent from and elucidated with reference to the embodiments described hereinafter.

Figure 2:
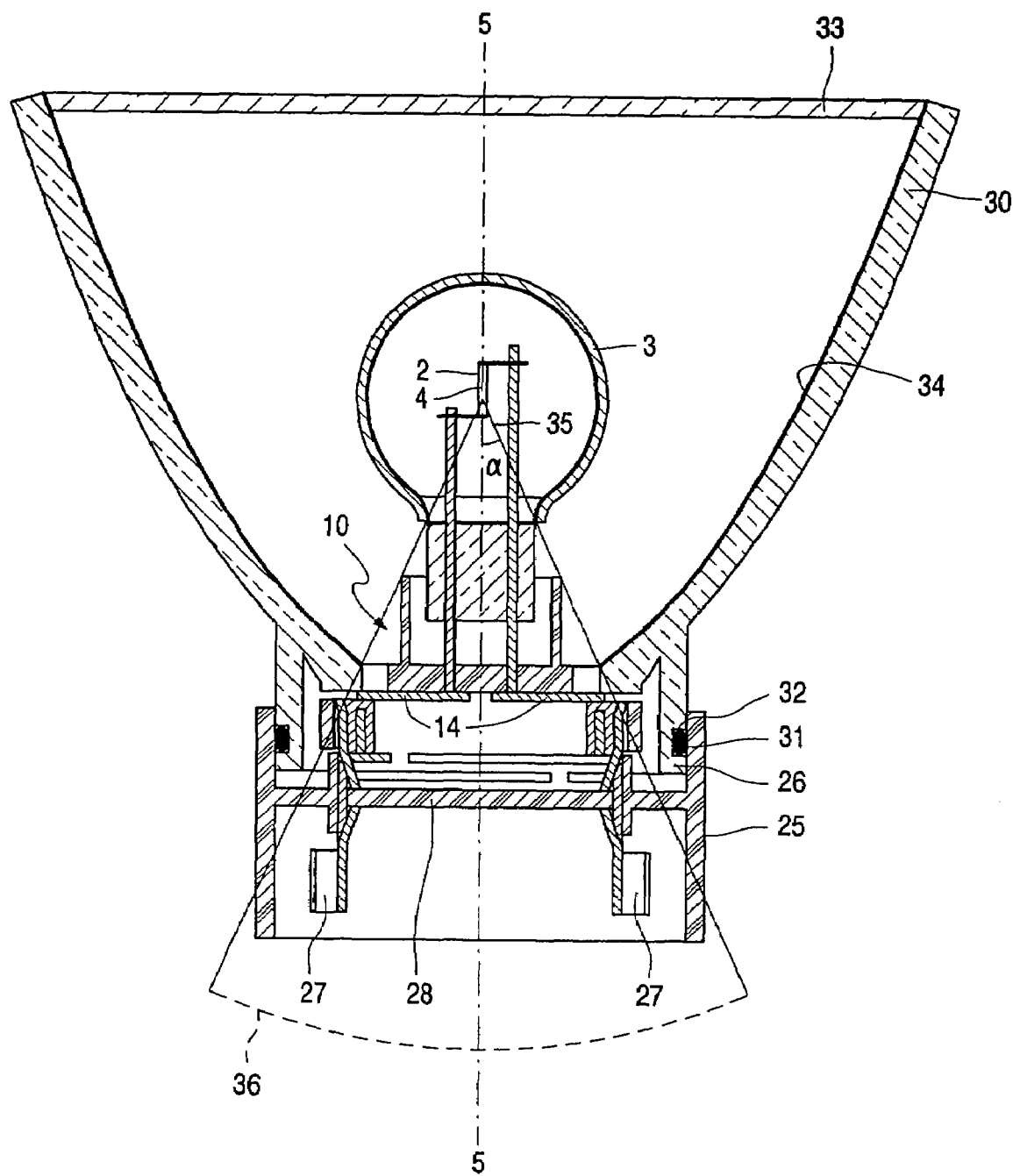

In the drawings:

FIG. 1 is a side view, partly cut away and partly in cross-section, of an electric lamp in accordance with the invention comprising a lamp cap; and FIG. 2 shows an electric lamp provided with a reflector and an adapter.

The Figures are purely schematic and not drawn to scale. Particularly for clarity, some dimensions are exaggerated strongly. In the Figures, like reference numerals refer to like parts whenever possible.

FIG. 1 shows an electric lamp in accordance with the invention, a part of which is shown in a side view, partly cut away, and another part of which is shown in cross-section. The electric lamp comprises a light-transmitting lamp vessel 1, for example made of glass, which is closed in a gastight manner and in which an electric element 2, being a (spiral-shaped) tungsten incandescent body with a center 4 in the Figure, is axially positioned on an axis 5 and connected to current conductors 6 which issue from the lamp vessel to the exterior. The lamp shown has a filling of an inert gas, for example an Ar/Ne mixture, with a filling pressure slightly above 5 bar.

A lamp cap 10 is firmly connected to the lamp vessel 1. The lamp cap 10 has a synthetic resin housing 11. The housing 11 comprises a flat base portion 7 at least substantially perpendicular to the axis 5. The lamp vessel 1 is sealed in a gastight manner by means of a plate 8 of an insulating material, which plate lies in a plane at least substantially perpendicular to the axis 5. Electric element 2 is mounted in a previously defined position with respect to the plate 8 during the manufacture of the lamp. The plate 8 of the lamp vessel 1 is pressed home against the base portion by locking means 9, for example ridges, such that the electric element 2 will take up a previously defined position with respect to the reference means 12, for example studs. The studs 12 form part of the lamp cap and are designed to abut against a support 30, for example a reflector, as is visible in FIG. 2.

The lamp cap also comprises contact members 14 which are provided with a screen 13 and to which the current conductors 6 of the lamp vessel 1 are connected. A resilient intermediate portion 15, which is provided with coupling means 17, i.e. resilient tags in the Figure that are designed for coupling the reflector to the lamp cap, forms one whole with the housing 11. The resilient action of the intermediate portion is obtained in that the intermediate portion is made so as to be hollow, so that no more than a wall remains as the intermediate portion, after which a major portion of the wall is removed by means of two grooves 18 which run perpendicularly to the axis 5. The remaining portion of the wall forms a bridge 19 which is rotated, near the next groove, through an angle of, for example, 180° about the axis 5.

The lamp vessel 1 of the electric lamp has a relatively small axial dimension of approximately 22 mm and is suitable for consuming a relatively high power of, for example, 5 to 25 W. The electric lamp has a service life of approximately 6000 hours in this case.

In accordance with the invention, at least a part of the lamp vessel 1 is covered with a light-absorbing coating 3 having an average thickness of 2–3 μm.

FIG. 2 shows the electric lamp provided with a support 30, being a reflector with a transparent plate 33 in the drawing, as well as with an adapter 25. In this configuration of a lamp with an adapter and a reflector, where the reflector is provided with a rubber ring 31 retained in a groove 32, the rubber ring seals off the opening 26 between the lamp cap and the reflector in a gastight manner. The adapter is provided with standardized contact points 27 which are passed through the bottom plate 28 of the adapter in a gastight manner and are connected to contact members 14 of the lamp cap 10.

It is visible in the drawing that the lamp cap 10 falls substantially entirely within a cone 36 which has its apex 35 in the center 4 of the electric element 2 and has an apex half angle α of 25°. The light originating from the electric element 2 can reach the reflecting surface 34 substantially without obstruction and is reflected there at least substantially axially in the direction of the transparent plate 33.

EXAMPLE 1

Iron oxide ($Fe_2O_3$) is stabilized in a 50/50% water/ethanol mixture using dimethylaminopropylsilane as a stabilizer. To this end, a dispersion of $Fe_2O_3$ is made using 3 g $Fe_2O_3$ (Sicotrans 2816; commercially available from BASF) to which 20 g of a slightly acidified 50/50% water/ethanol mixture is added. Subsequently 0.1 g aminosilane is added and the dispersion is milled using 2 mm zirconia milling balls.

Separately, a sol-gel hydrolysis mixture was made. A tetraethoxy silane (TEOS) hydrolysis mixture is made by mixing 15 g TEOS, 50 g ethanol, 3.6 g water and 1.1 g 0.175 M HCl and subjecting said mixture to hydrolysis during 24 hours.

A coating liquid is prepared by mixing the $Fe_2O_3$ dispersion and the hydrolysis mixture in a ratio of 1:1 and adding 20 wt % methoxypropanol to the mixture. The coating liquid is subsequently spray coated onto the outer surface of the major part of a lamp vessel. The coating is cured for 10 minutes at a temperature of 250° C. In this manner, a light-absorbing coating in a thickness of 1.5 μm is obtained on a glass lamp vessel without crack formation during drying and curing.

EXAMPLE 2

A dispersion of $Fe_2O_3$ is made as disclosed in Example 1.

Separately, a methyltrimethoxy silane (MTMS) hydrolysis mixture is made by mixing 40 g MTMS, 0.15 g TEOS, 3 g ethanol, 32 g water and 0.15 g acetic acid and subjecting said mixture to hydrolysis during 24 hours.

A coating liquid is prepared by mixing the $Fe_2O_3$ dispersion and the hydrolysis mixture in a ratio of 1:1 and adding 20 wt % methoxypropanol to the mixture. The coating liquid is subsequently spray coated onto the outer surface of the major part of a lamp vessel and cured. The light-absorbing coating obtained has a thickness of 2–3 μm and shows no signs of crack formation during drying and curing.

EXAMPLE 3A

Zinc ferrite ($ZnFe_2O_4$) (Dainichiseika, 3210) is stabilized in ethanol using (N,N-dimethylaminopropyl)trimethoxy silane (2 Me-APTMS) as a stabilizer. A dispersion of $ZnFe_2O_4$ is made by mixing 30 g $ZnFe_2O_4$, 3.0 g 2 Me-APTMS, 20 g ethanol and 1.5 g 0.2 M HCl. The dispersion is milled on a roller bench for about 5 days, using 2 mm yttrium stabilized zirconia milling balls.

Separately, a MTMS hydrolysis mixture was prepared of the following composition: 40 g MTMS, 0.86 g TEOS, 32 g water, 4.3 g ethanol and 0.14 g acetic acid. The mixture is hydrolysed during 48 hours while stirring.

A coating liquid is prepared by mixing the $ZnFe_2O_4$ dispersion and the hydrolysis mixture in a weight ratio of 1:0.5. To reduce spinning artefacts, about 20% w/w of diacetone alcohol (DAA) is added. The coating liquid is subsequently spin coated on glass plates.

The resulting coating has a thickness of 4 μm with a color point within the specification for amber. The transmission of the coating is 51.7%. This means that if the coating is applied to a lamp vessel about 250 lumen comes out of a lamp of 500 lumen.

EXAMPLE 3B

The zinc ferrite dispersion and the hydrolysis mixture are prepared as described in Example 3A. To make the coating liquid, the zinc ferrite dispersion and the hydrolysis mixture are mixed in a weight ratio of 1:1. In order to reduce spinning artefacts, about 20% w/w of DAA is added. The coating liquid is spin coated on glass plates.

The resulting coating has a thickness of 4 μm with a color point within the S.A.E.-specifications. The transmission of the coating is 56.6%.

EXAMPLE 4A

Iron oxide ($Fe_2O_3$) (Johnson Matthey AC1070) is stabilized in ethanol using (N,N-dimethylaminopropyl)trimethoxy silane (2 Me-APTMS) as a stabilizer. A dispersion of $Fe_2O_3$ is made by mixing 18 g $Fe_2O_3$, 1.8 g 2 Me-APTMS, 20 g ethanol and 0.9 g 0.2 M HCl. The dispersion is milled on a roller bench for about 5 days, using 2 mm yttrium stabilized zirconia milling balls.

Separately, a MTMS hydrolysis mixture was prepared of the following composition: 40 g MTMS, 0.86 g TEOS, 32 g water, 4.3 g ethanol and 0.14 g acetic acid. The mixture is hydrolysed during 48 hours while stirring.

A coating liquid is prepared by mixing the $Fe_2O_3$ dispersion and the hydrolysis mixture in a weight ratio of 1:1. To reduce spinning artefacts, about 20% w/w of diacetone alcohol (DAA) is added. The coating liquid is subsequently spin coated on glass plates.

The resulting coating has a thickness of 4.3 μm with a color point within the specifications for red. The transmission of the coating is 14.9%.

EXAMPLE 4

Iron oxide ($Fe_2O_3$) (Johnson Matthey AC1070) is stabilized in ethanol using 2 Me-APTMS as a stabilizer. A dispersion of $Fe_2O_3$ is made by mixing 12 g $Fe_2O_3$, 1.2 g 2 Me-APTMS, 20 g ethanol and 0.6 g 0.2 M HCl. The dispersion is milled on a roller bench for about 5 days, using 2 mm yttrium stabilized zirconia milling balls Separately, a MTMS hydrolysis mixture was prepared of the following composition: 40 g MTMS, 0.86 g TEOS, 32 g water, 4.3 g ethanol and 0.14 g acetic acid. The mixture is hydrolysed during 48 hours while stirring.

A coating liquid is prepared by mixing the $Fe_2O_3$ dispersion and the hydrolysis mixture in a weight ratio of 1:1. To reduce spinning artefacts, about 20% w/w of diacetone alcohol (DAA) is added. The coating liquid is subsequently spin coated on glass plates.

Subsequently, the coating is treated with an $O_2$-plasma for a few minutes. On top of the coating, a second coating layer is spin coated. Said second coating layer comprises the same coating liquid as that used for the first coating layer.

The resulting coating has a thickness of 5.3 μm with a color point within the specifications for red. The transmission of the coating is 17.1%.

The invention claimed is:

1. An electric lamp comprising: a light-transmitting lamp vessel which accommodates a light source, wherein at least a part of the lamp vessel is provide with a light-absorbing coating, the light-absorbing coating comprising: pigments stabilized with a stabilizer which are incorporated in a sol-gel matrix, wherein said stabilizer includes dimethylaminopropylsilane.

2. An electric lamp as claimed in claim 1, wherein said stabilizer includes (N,N-dimethylaminopropyl)trimethoxysilane or (N,N-dimethylaminopropyl)triethoxysilane.

3. An electric lamp as claimed in claim 1, wherein a thickness $t_c$ of the light-absorbing coating is $t_c \geq 1.5$ μm.

4. An electric lamp as claimed in claim 1, wherein a thickness $t_c$ of the light-absorbing coating is $t_c \geq 3$ μm.

5. An electric lamp as claimed in claim 1, wherein the pigment is an inorganic pigment.

6. An electric lamp as claimed in claim 5, wherein the pigment is selected from the group consisting of iron oxide, iron oxide doped with phosphor, zinc-iron oxide, cobalt aluminate, neodymium oxide, bismuth vanadate, zirconium praseodymium silicate or mixtures thereof.

7. A lamp vessel provided with a light-absorbing coating, the light-absorbing coating comprising pigments stabilized with a stabilizer which are incorporated in a sol-gel matrix, wherein said stabilizer includes dimethylaminopropylsilane.

8. The lamp vessel of claim 7, wherein said stabilizer includes dimethylaminopropylsilane, (N,N-dimethylaminopropyl)trimethoxysilane, or (N,N-dimethylaminopropyl)triethoxysilane.

9. The lamp vessel of claim 7, wherein a thickness $t_c$ of the light-absorbing coating is $t_c \geq 1.5$ μm.

10. The lamp vessel of claim 7, wherein a thickness $t_c$ of the light-absorbing coating is $t_c \geq 4$ μm.

11. The lamp vessel of claim 7, wherein the pigment is an inorganic pigment.

12. The lamp vessel of claim 7, wherein the pigment is selected from the group consisting of iron oxide, iron oxide doped with phosphor, zinc-iron oxide, cobalt aluminate, neodymium oxide, bismuth vanadate, zirconium praseodymium silicate or mixtures thereof.

* * * * *